Nov. 11, 1924.  1,514,887
I. BRANDT
DRIVING CONNECTION FOR CORN PICKERS AND THE LIKE
Filed May 5, 1924
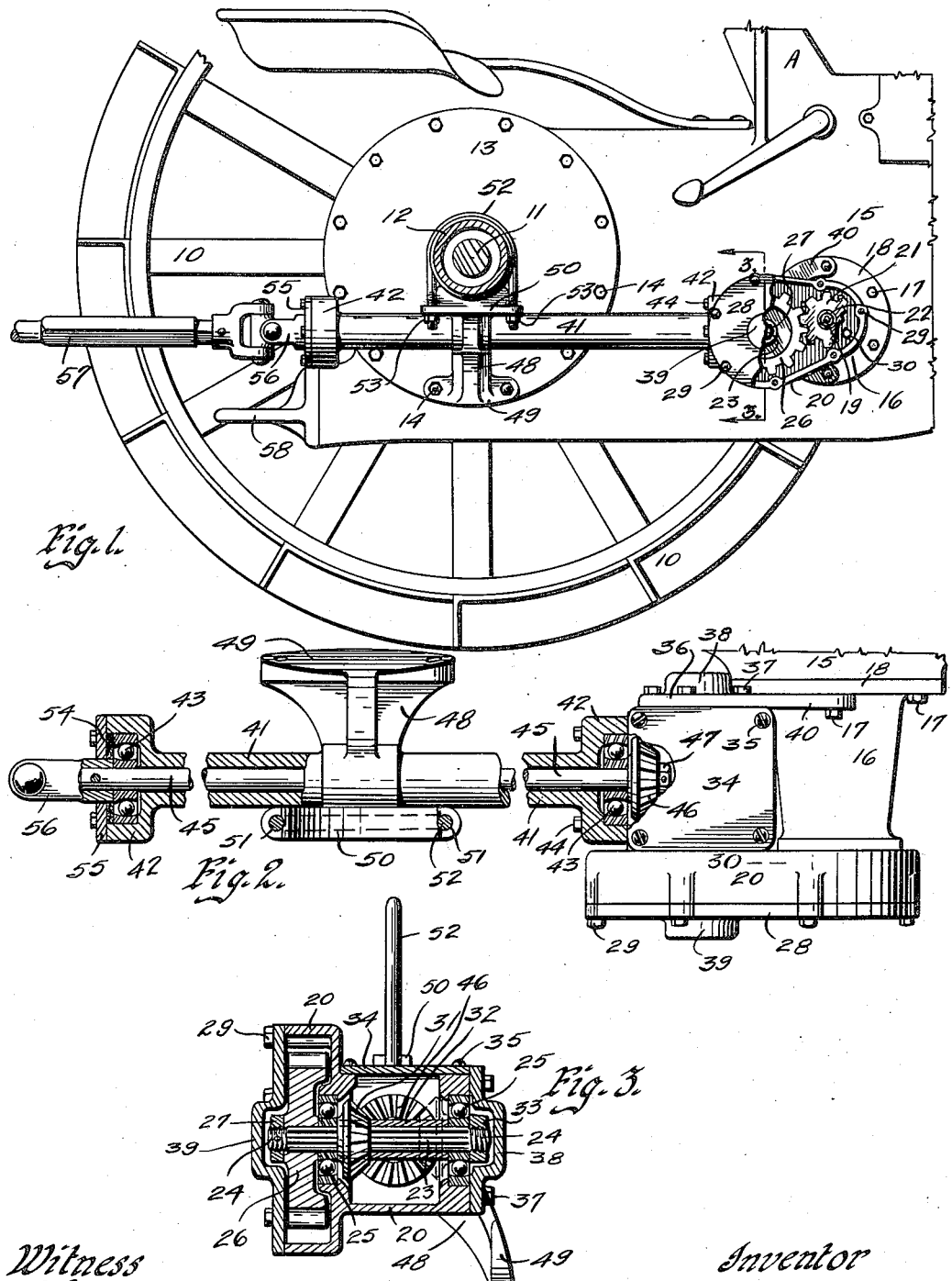
Witness
Ray Kusher
Inventor
Isaac Brandt
by Bair & Freeman Attys.

Patented Nov. 11, 1924.

1,514,887

UNITED STATES PATENT OFFICE.

ISAAC BRANDT, OF BOXHOLM, IOWA.

DRIVING CONNECTION FOR CORN PICKERS AND THE LIKE.

Application filed May 5, 1924. Serial No. 711,061.

*To all whom it may concern:*

Be it known that I, ISAAC BRANDT, a citizen of the United States, residing at Boxholm, in the county of Boone and State of Iowa, have invented a certain new and useful Driving Connection for Corn Pickers and the like, of which the following is a specification.

The object of my invention is to provide a driving connection between a tractor and a corn picker or the like of simple, durable and comparatively inexpensive construction.

More particularly, my invention relates to an attachment adapted to be secured to a tractor of the Fordson type wherein a farm implement such as a corn picker or the like, can be operated from the engine of the tractor and controlled therefrom.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a portion of a Fordson type tractor, parts being broken away and shown in section, with my improved driving connection attached thereto.

Figure 2 is a top plan view of the driving connection, parts being shown in section to better illustrate the construction thereof; and Figure 3 is a sectional view taken on line 3—3 of Figure 1.

In the accompanying drawings, I have used the reference character A to indicate generally a tractor which is provided with a pair of rear driving wheels 10 mounted upon an axle 11. The axle 11 is journalled in a suitable axle housing 12.

The axle housing 12 includes a differential case 13, the side plates of which are retained in position by bolts 14.

My attachment is designed to be partially retained in position by some of the bolts 14, as will hereinafter be more fully set forth.

On the transmission case 15 of the tractor A is a pulley shaft housing 16 retained in position by bolts 17 extending through a flange 18, which forms a part of the pulley shaft housing 16. Ordinarily, the pulley shaft 19 of the tractor has a pulley mounted thereon on the outer end of the pulley shaft housing 13.

A portion of my driving case is mounted on the pulley shaft housing by suitable bolts and also connected to the flange 18 thereof by means of the bolts 17.

My improved driving connection for corn pickers or the like comprises a casing 20, which consists substantially of two parts as shown in Figure 2 of the drawings.

One of the parts of the casing A is comparatively thin and substantially long, while the other part thereof is substantially square.

The casing 20 has a gear 21 mounted therein, which gear is fixed to the pulley shaft 19. The pulley shaft 19 is splined so that the gear 21 can be fixed thereto. The gear is retained in position by a nut 22 on the outer end of the shaft 19.

Journalled in the walls of the casing 20 is a splined shaft 23 having its ends screw threaded, as at 24. The shaft 23 is mounted in suitable ball bearings 25, which are positioned within the casing 20.

A gear 26 is mounted on the shaft 23 and has one side abutting against one of the roller bearings 25, and is in mesh with the gear 21, as clearly shown in Figure 1 of the drawings.

A nut 27 on the screw threaded end 24 of the shaft 23, adjacent the gear 26, retains the gear 26 in position.

A cover plate 28 is removably mounted upon the casing 20 and retained in position by machine screws 29.

A portion of the casing 20 is secured to the pulley shaft housing 16 by means of machine screws 30 extending through one wall of the casing 20.

The machine screws 30 extend into the pulley shaft housing 16 in screw threaded openings ordinarily provided therein.

A portion of the gear 21 is broken away in Figure 1 of the drawings to show the machine screws 30.

The splined shaft 23 has a bevel gear 31 thereon which abuts against one of the roller bearings 25 and is retained against any sliding movement by a sleeve 32 on the shaft 23.

One end of the sleeve 32 rests against one of the roller bearings 25.

A nut 33 is on the free screw threaded end 24 of the shaft 23.

From the construction of the parts just described, it will be seen that the gears 26 and 31 and the sleeve 32 are all retained in position as a complete unit by the nuts 27 and 33, as clearly shown in Figure 3 of the drawings.

In order to gain access into the portion of the casing 20, which has the gear 31 therein, I provide a removable cover-plate 34 held in position by machine screws 35.

A side plate 36 is also connected to the casing 20 by machine screws 37.

The side plate 36 is provided with an outpressed part 38 so as to accommodate the nut 33 on the shaft 23. The plate 28 is also formed with an outpressed portion 39 to accommodate the nut 27.

The plate 36 has formed integral therewith a yoke 40, which straddles around the pulley shaft housing 16 and has openings therein (not shown) adapted to register with openings formed in the flange 18 of the pulley shaft housing 16 so that the machine bolts 17 may extend therethrough for retaining both the casing 20 and the pulley shaft housing 16 in position on the transmission case of the tractor A.

Fixed to one side of the casing 20 is the shaft housing 41, having an enlarged portion 42 on each of its ends provided with roller bearings 43.

One of the enlarged portions 42 is secured to the casing 20 by means of machine screws 44.

A shaft 45 is journalled in the roller bearings 43 and has on one of its ends a bevel gear 46 in mesh with the bevel gear 31. A nut 47 retains the bevel gear 46 in position on the shaft 45.

The shaft housing 41 extends below the axle housing 12 of the tractor A and is secured thereto as will hereinafter be more fully set forth.

A casting 48 has a pair of depending flanges 49 thereon which have openings therein (not shown) adapted to register with the openings in the differential case for receiving the bolts 14.

The lower portion of the casting 48 is curved so as to fit against the side of the differential case 13.

A flange 50 is formed on the casting 48 and has a pair of openings 51 therein for receiving an inverted U-bolt 52, which extends around the axle housing 12 for thereby retaining the shaft housing 41 in position on the tractor.

The U-bolt 52 has nuts 53 on each of its screw threaded ends.

The enlarged portion 42 on the rear end of the shaft housing 41 has a washer 54 therein.

A plate 55 bolted to the enlarged portion 52 holds the washer 54 in position as well as the ball bearings 43.

The entire shaft housing 41 and the gear casing 20 are designed to be filled with lubricating oil or grease.

The washer 54 prevents any grease from running out.

The plates 28, 34 and 36 may have any suitable packing between them and the casing 20 to prevent the oil from leaking through.

The outer free end of the shaft 45 has fixed to it a universal joint 56, which is connected to a telescoping shaft structure 57 of any suitable kind. The telescoping shaft 57 can be connected to a corn harvester or other farm implement.

The telescoping shaft compensates for any movement of the tractor relative to the machine operated and driven thereby.

The corn harvester or other machine, which is drawn by the tractor A, can be secured to the hitch 58 thereof.

From the construction of the parts just described, it will be seen that I have provided a very simple and efficient driving gear connection between a tractor and an implement operated therefrom.

In this connection it may be mentioned that the direction of rotation of the shaft 45 may be changed by removing the bevel gear 31 and reversing it on the shaft 23 so that it assumes the position shown in dotted lines in Figure 3.

The sleeve 32 is replaced upon the shaft 23 and will retain the bevel gear 31 in its assumed dotted line position. The shaft 23 can be removed by removing the plate 28 and the plate 36.

It will be seen that the gears mounted within the casing 20 are easily accessible due to the plates 28, 34 and 36.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A drive connection for a tractor and a farm implement including a casing mounted on a tractor adjacent the pulley drive shaft thereof, a gear in said casing operatively driven from the pulley drive shaft of the tractor, a shaft journalled in said casing for said gear, a bevel gear on said shaft, a drive shaft housing secured to said casing at one end, means for connecting the drive shaft housing to the rear axle housing of the tractor, a drive shaft in said last housing, a bevel gear on said last drive shaft mounted within the casing in mesh with said first bevel gear, said first bevel gear being slidably but non-rotatably mounted on its shaft, a sleeve on said shaft for retaining said last bevel gear against sliding movement as and for the purposes stated.

2. A drive connection for a tractor and a farm implement including a casing mounted on a tractor adjacent the pulley drive shaft thereof, cover and slide plates removably secured to said casing, a gear in said casing operatively driven from the pulley drive shaft of the tractor, a shaft journalled in said casing for said gear, a bevel gear on said shaft, a drive shaft housing secured to said casing at one end, means for connecting the drive shaft housing to the rear axle housing of the tractor, a drive shaft in said last housing, a bevel gear on said last drive shaft mounted within the casing in mesh with said first bevel gear, said first bevel gear being slidably but non-rotatably mounted on its shaft, a sleeve on said shaft for retaining said last bevel gear against sliding movement as and for the purposes stated.

3. A drive connection for a tractor and a farm implement including a casing mounted on a tractor adjacent the pulley drive shaft thereof, a gear in said casing operatively driven from the pulley drive shaft of the tractor, a shaft journalled in said casing for said gear, a bevel gear on said shaft, a drive shaft housing secured to said casing at one end, means for connecting the drive shaft housing to the rear axle housing of the tractor, a drive shaft in said last housing, a bevel gear on said last drive shaft mounted within the casing in mesh with said first bevel gear, said first bevel gear being slidably but non-rotatably mounted on its shaft, a sleeve on said shaft for retaining said last bevel gear against sliding movement, the parts being so arranged that the access may be had into said casing for removing the said first bevel gear and the sleeve for reversing them on their shaft whereby the direction of rotation of the second drive shaft may be changed as specified.

Des Moines, Iowa, April 21, 1924.

ISAAC BRANDT.